United States Patent Office 3,803,162
Patented Apr. 9, 1974

3,803,162
7-TRIAZOLYL-3-PHENYLCOUMARINS
Horst Aebli, Basel, Hans Balzer, Munchenstein, Basel-Land, and Fritz Fleck, Bottmingen, Basel-Land, Switzerland, assignors to Sandoz Ltd., Basel, Switzerland
No Drawing. Filed Sept. 25, 1970, Ser. No. 75,733
Claims priority, application Switzerland, Oct. 3, 1969, 14,914/69; Nov. 13, 1969, 16,886/69
Int. Cl. C07d 85/48
U.S. Cl. 260—304        10 Claims

ABSTRACT OF THE DISCLOSURE 1,2,3-triazole compounds of the formula

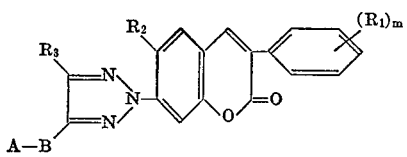

(I)

wherein

A stands for a heterocyclic radical containing 2 or 3 heteroatoms of which at least 1 is a nitrogen atom,
B for a single bond or a bridge member containing 1 to 3 conjugated double bonds,
$R_1$ for a hydrogen or halogen atom, a lower alkyl or alkoxy group which may be substituted or a phenyl radical which may be substituted,
$R_2$ for a hydrogen atom or a methyl group,
$R_3$ for a hydrogen atom or an alkyl or phenyl group which may be substituted, and
m for a whole number from 1 to 5 which are useful as optical brighteners for synthetic materials, especially polyester.

Of the 1,2,3-triazole derivatives of 3-phenylcoumarin, the benzotriazoles and naphthotriazoles derived from 3-phenyl-7-aminocoumarin have achieved technical importance for brightening synthetic materials, particularly as brightener additives in the spinning solutions or melts for synthetic fibres, notable polyester fibres. These brighteners, however, have limited applicability on account of their relatively low saturation limit.

In Belgian Pat. No. 695,656 non-anellated vicinal triazole compounds of 3-phenylcoumarin are disclosed which, owing to the abbreviated conjugation of the double bonds, produce less greenish brightening effects, even at high concentrations, but on the other hand their fluorescence is generally lower. Consequently they are inferior as brighteners to the aforenamed naphthotriazole and benzotriazole compounds, especially in polyester spinning melts.

It has now, surprisingly been found that by introducing into nonanellated vicinal triazole derivatives of 3-phenyl-7-aminocoumarin a further azole, benzazole or naphthazole ring, which may be bound to the triazole ring either directly or through a suitable bridge member, brighteners are obtained which are free from the aforestated disadvantages of the known 1,2,3-triazole compounds of 3-phenylcoumarin and reach a considerably higher degree of maximum whiteness, producing effects of neutral shade and high brilliance in synthetic materials and melt spun synthetic fibres, especially polyester fibres.

This invention thus relates to a process for the production of new fluorescing compounds of the general formula

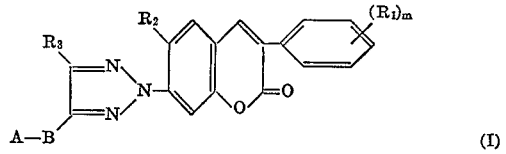

(I)

where

A stands for an oxadiazole, pyrazole or thiadiazole radical which may be substituted or a benzoxazole, benzothiazole, benzimidazole or benzotriazole radical bound in the 2-, 5- or 6-position or a naphthoxazole or naphthotriazole radical bound in the 2-position,
B for a single bond or a bridge member containing 1 to 3 conjugated double bonds,
$R_1$ for a hydrogen or halogen atom, a lower alkyl or alkoxy group which may be substituted or a phenyl radical which may be substituted,
$R_2$ for a hydrogen atom or a methyl group,
$R_3$ for a hydrogen atom or an alkyl or phenyl group which may be substituted and
m for a whole number from 1 to 5.

The process of this invention comprises the cyclization of hydrazonoximes of formula

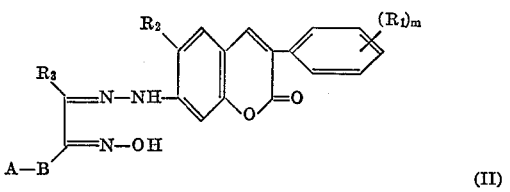

(II)

or

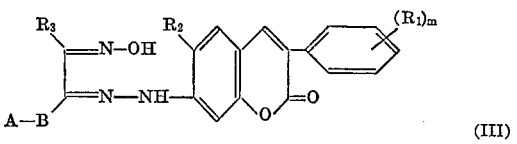

(III)

in the presence of a solvent and with the aid of a dehydrating agent to yield the corresponding 1,2,3-triazole compounds; or the cyclization of hydrazonoximes of formula

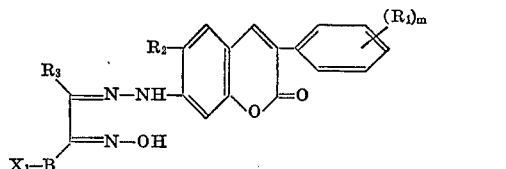

(IV)

or

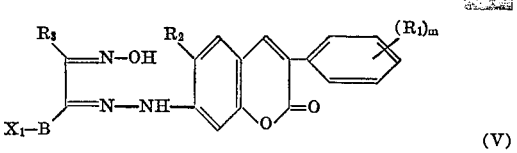

(V)

where $X_1$ stands for a carboxylic acid group or one of its functional derivatives, in the presence of a solvent and with the aid of a dehydrating agent, to the 1,2,3- triazole compound, followed by the reaction of this compound at elevated temperature and in the presence of an acid condensing agent with a compound of formula

(VI)

where V stands for OH, NH₂ or SH and Ar for a benzene or naphthalene radical which may be substituted; or the cyclization of hydrazonoximes of formula

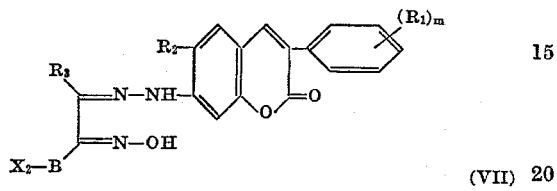

(VII)

or

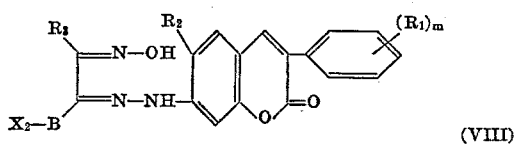

(VIII)

where X₂ stands for a group of formula

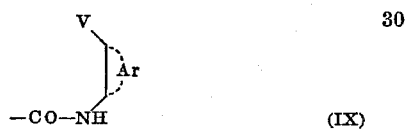

(IX)

in which V is OH, NH₂ or SH and Ar a benzene or naphthalene radical which may be substituted, in the presence of a solvent and with the aid of a dehydrating agent, to give the 1,2,3-triazole compound, followed by cyclization of the group X₂ in this compound with the aid of an acid catalyst at elevated temperature; or the cyclization of hydrazonoximes of formula

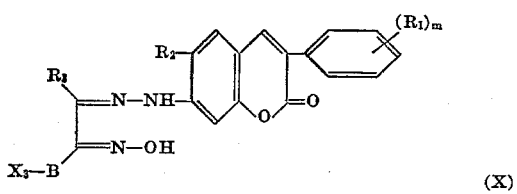

(X)

where X₃ stands for a nitro group or an acylamino group, in the presence of a solvent and with the aid of a dehydrating agent, to the 1,2,3-triazole, followed by reduction of the nitro group to the amino group in acid medium or hydrolysis of the acylamino group with the aid of mineral acids, diazotization of the resulting amino group, coupling with an aromatic amine which couples in orthoposition to the amino group, and finally oxidation; or the cyclization of hydrazonoximines of formula

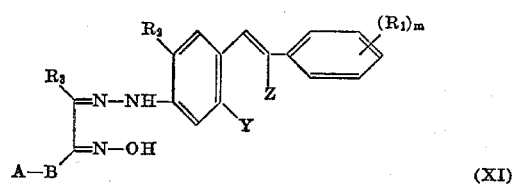

(XI)

where Y stands for an alkoxy group and Z for the carboxylic acid group or one of its functional derivatives, in the presence of a solvent and with the aid of a dehydrating agent, to the 1,2,3-triazole, followed by reaction with an acid dealkylating agent to give the coumarin derivative.

The brightening agents disclosed herein may bear one or more nonchromophoric substituents in the radical denoted A in the general Formula I. Examples of suitable substituents are straight or branched alkyl-($C_1$-$C_{12}$) such as methyl, ethyl, iso-propyl, tert. butyl, iso-octyl and dodecyl; substituted or unsubstituted phenyl; halogen such as fluorine, chlorine or bromine; lower alkoxy-($C_1$-$C_4$) such as methoxy, ethoxy or butoxy; carboxyl, carboxylic acid ester, carboxylic acid amide, substituted carboxylic acid amide and cyano.

Thus the radical A may have, for example one of the following formulae:

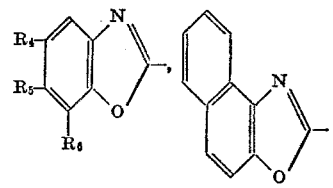

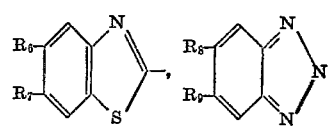

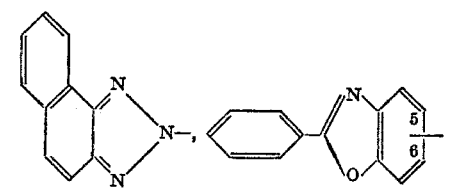

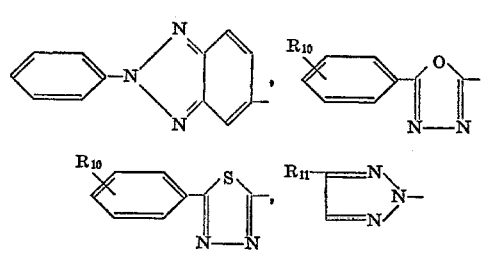

where $R_4$ stands for hydrogen, halogen such as chlorine, alkyl with 1 to 8 carbon atoms, alkoxy with 1 to 8 carbon atoms, phenyl, benzyl or dimethylbenzyl, $R_5$ for hydrogen, halogen such as chlorine, alkyl with 1 to 8 carbon atoms, alkoxy with 1 to 8 carbon atoms, phenyl, benzyl or dimethylbenzyl, $R_6$ for hydrogen or alkyl with 1 to 8 carbon atoms, $R_7$ for hydrogen or alkyl with 1 to 8 carbon atoms, $R_8$ for hydrogen or alkyl with 1 to 8 carbon atoms, $R_9$ for hydrogen or alkoxy with 1 to 8 carbon atoms, $R_{10}$ for hydrogen, alkyl with 1 to 8 carbon atoms, phenyl, chlorophenyl or alkylphenyl with 1 to 8 carbon atoms in the alkyl radical, and $R_{11}$ for methyl, phenyl, chlorophenyl or alkylphenyl with 1 to 8 carbon atoms in the alkyl radical.

The radicals

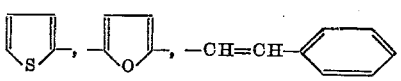

and preferably

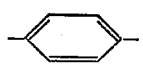

may be cited as examples of suitable bridge members B having 1 to 3 conjugated double bonds.

If $R_1$ stands for a halogen atom it may be a bromide or fluorine but is preferably a chlorine atom. If it stands for a lower, substituted or unsubstituted alkyl or alkoxy group it may contain 1 to 8 carbon atoms and may represent, e.g. methyl, ethyl, iso-propyl, tert. butyl, tert. amyl, n-butyl, tert. octyl, methoxy or ethoxy. If it stands for an unsubstituted or substituted phenyl group it may be, e.g. phenyl, methylphenyl or chlorophenyl.

If $R_3$ stands for an alkyl or phenyl group it may have any one of the meanings assigned to $R_1$.

Especially valuable 1,2,3 - triazole compounds correspond to the formula

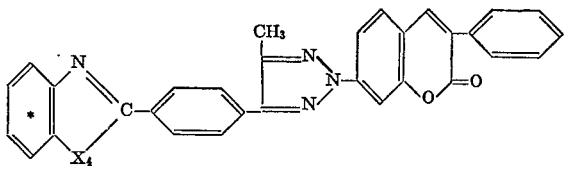

wherein $X_4$ represents —O— or —S— and the benzene nucleus * may bear 1 or 2 methyl or tert.butyl radicals or 1 tert.octyl radical. In the present process the triazole ring closure is of special importance, because it has been found that the triazole ring is the most valuable connecting member between the azole radical A and the 3-phenylcoumarin radical.

Derivatives of 3-phenylcoumarin having a benzoxazole radical in the 7-position are known to be fluorescing compounds, but they have not gained any appreciable technical importance.

On the other hand, the previously mentioned non-anellated vicinal triazole compounds derived from 3-phenyl-7-aminocoumarin, which do not bear the azole radical A, are only half as effective as the disclosed brighteners in polyamide and polyester spinning melts.

The 1,2,3-triazole ring closure in the hydrazonoximes of Formulae II to V, VII, VIII, X and XI can be conveniently carried out by heating in the presence of an organic solvent and preferably a tertiary base, together with a dehydrating agent in an amount not less than that required to split off 1 mole of water.

The suitable dehydrating agents include halides of phosphoric acid and halides or preferably anhydrides of carboxylic acids as well as carboxylic acid amides. Among the carboxylic acid anhydrides, those of lower fatty acids such as acetic, propionic and butyric acid and mixtures of anhydrides of these acids are especially suitable. Of the carboxylic acid amides, urea as a diamide of carbonic acid has a specially important place. With this dehydrating agent both the hydrazonoximes and their O-acyl derivatives, preferably the O-acetyl derivatives, can be converted into the corresponding 1,2,3-triazole derivatives of Formula I.

The O-acyl derivatives of hydrazonoximes can be prepared in the known manner by the reaction of hydrazonoximes with acylating agents such as acetic anhydride, if necessary in the presence of a tertiary base such as pyridine.

Inert solvents are suitable for the hydrazonoximes and their O-acyl derivatives in the joint presence of the aforenamed dehydrating agents. Examples are aromatic hydrocarbons, chlorinated hydrocarbons, ethers, ketones, acid amides, sulphoxides and sulphones. Solvents of special value for the process are acid amides, sulphoxides and sulphones, such as dimethyl formamide, diethyl formamide, dimethyl acetamide, N-methylpyrrolidone, dimethyl sulphoxide, dibutyl sulphoxide, tetramethylene sulphone (sulpholan) and hexamethylphosphoric acid triamide (HMPT).

Diethylaminobenzene, dimethylaminobenzene, quinoline, pyridine, alkylpyridines and technical mixtures of pyridine bases may be named as examples of tertiary bases whose presence promotes the reaction.

The solvent is generally employed in amounts equal to, or several times greater than, the weight of the hydrazonoxime, depending on the solubility of the latter. The carboxylic anhydride is used preferably in excess, although the quantitative relation may vary within wide limits. The tertiary base can be added in stoichiometric or catalytic amounts relative to the acid anhydride.

The suitable reaction temperatures ranges from 20° C. to 200° C., the optimum temperature range being 50–175° C. It is best to heat up the reaction mixture in stages for ring closure of the triazole, e.g. first to 80° C., then to 100° C. and finally to the boiling temperature of the reaction mixture.

Cyclization to the triazole of Formula I can be also accomplished by heating to temperatures of 100° C. to 210° C., preferably to 120–175° C., in the presence of a carboxylic acid amide, preferably urea.

In this last case it is not necessary to dry the hydrazonoxime prior to cyclization; it can be entered into a urea melt in the moist state. As the reaction mixture is heated up the water evaporates and cyclization takes place. It is of advantage to employ the urea in amounts two to twenty or preferably three to fifteen times greater than the dry weight of the hydrazonoxime. A combination of urea and a fatty acid of low molecular weight such as acetic acid has been found to have a highly favorable effect.

If the starting material is a hydrazonoxime of Formula II or III the reaction is then at an end. The 1,2,3-triazole compound formed can be separated by cooling and diluting the reaction medium with a suitable agent, by partial or complete evaporation of the solvent, or by distillation in water vapor, etc. It is then filtered, washed if necessary.

The hydrazonoximes of Formulae II and III used as starting materials can be produced in the known way by the reaction of α-oximinoketones with substituted or unsubstituted 3-phenyl-7-hydrazino-coumarins, or by the coupling of diazonium salts of substituted or unsubstituted 3-phenyl-7-aminocoumarins with β-ketocarboxylic acid derivatives with subsequent oximation, or by the reaction of α-oximinoketones with substituted or unsubstituted para-hydrazino-orthoalkoxy-(α-phenyl)-cinnamic acid nitriles.

The substituent $X_1$ in Formulae IV and V may be either a carboxylic acid group or one of its functional derivatives, e.g. a halide, preferably a chloride group, an anhydride group, an ester group, e.g. of a lower alcohol, or an amide group of a carboxylic acid, or the cyano group.

The reaction of the substituent $X_1$ with a compound of Formula VI is carried out at elevated temperature, e.g. in the range of 100° C. to 250° C., in the presence of acid condensing agents, e.g. boric acid or zinc chloride, in catalytic amounts of 1–10%, or of polyphosphoric acid in an amount sufficient to split off at least 1 mole of water and preferably in substantial excess so that it serves at the same time as a solvent. If boric acid or zinc chloride is used, it is advisable to select an organic solvent which is inert to the reactants, e.g. a hydrocarbon or halogenated hydrocarbon of high boiling point. If the substituent $X_1$ represents —COOH or —CO—O—OC— only water is split off in the reaction, probably with intermediate formation of a —CO—NH— bridge which reacts further with the substituent V, with cleavage of water, to form the azole compound. If the substituent $X_1$ represents —CO—Hal or preferably —CO—Cl, it is advisable to form the acid amide in the first step of the reaction, then to isolate the amide and carry out ring closure. If the substituent $X_1$ represents a carboxylic acid ester group, the alcohol or phenol bound in the ester is split off first, while if $X_1$ represents —CO—NH$_2$, ammonia is split off.

The substituent $X_2$ in the compounds of Formulae VII and VIII is converted into the azole compound under the aforestated conditions for the analogous reaction of $X_1$ with the compound of Formula VI.

With hydrazonoximes of Formula X, initially the nitro group is converted into the amino group in acid medium, e.g. by treatment with tin (II) chloride in glacial acetic acid in the presence of hydrogen chloride, at temperatures of about 20° C. to 100° C. or preferably at 30–80° C., or the acylamino group converted into the amino group in mineral acid solution, e.g. in 2–10% hydrochloric or 2–20% sulphuric acid solution, at 70–100° C. This amino group can be diazotized in mineral acid medium at 0–25° C. or preferably 0–15° C. For the coupling reaction an acid medium is used at temperatures of 0° C. to 50° C., e.g. 5–10° C. if an aminobenzene or aminonaphthalene free from sulphonic acid groups is used or at 40–50° C. if 2-aminonaphthalene-1-sulphonic acid is used, in which case the sulphonic acid group is split off at the same time. The resulting ortho-aminoazo compound is best oxidized to the aminotriazole compound in the presence of a catalyst, e.g. 0.02–0.4 mole or preferably 0.1–0.3 mole of a copper compound such as copper (II) acetate per mole of the ortho-aminoazo compound, and in an inert organic solvent which should preferably dissolve both the aminoazo compound and the copper compound, and with an oxidizing agent, preferably injected air or oxygen gas, at temperatures of 50° C. to 100° C., preferably 60–80° C.

In the hydrazonoximes of Formul XI the triazole ring is closed first as described above, then the resulting compound is heated, preferably in an inert solvent such as chlorobenzene, dichlorobenzene or nitrobenzene and in the presence of an acid dealkylating agent such as aluminium chloride or bromide, sodium aluminium chloride or pyridine hydrochloride, an elevated temperature, e.g. 70° C. to 200° C. or preferably 100° C. to 150° C. until lactone ring closure is complete. In this step the alkoxy group is split off, and from the radical Z water is split off, and from the radical Z water is split off if Z is COOH, an alcohol, or phenol if Z is —COO-alkyl, or —COO-aryl, or ammonia if Z is —CO—NH₂ or —CN. The triazole compounds thus obtained can be isloated in the manner described in the foregoing. Incorporated, in synthetic materials, notably in the spinning melts for polyester or polyamide fibres, they exhibit, contrary to expectation and in spite of the longer conjungation relative to the compounds disclosed in Belgian Pat. No. 695,656, a neutral to slightly reddish white shade and are distinguished further by their superior effectiveness in polyester spinning melts, this being especially the case with those which bear as radical A a benzoxazole radical.

In relation to the naphthotriazoles and benzotriazoles described in French Pat. No. 1,358,820, which with a relatively low saturation limit produce brilliant but greenish effects in polyester fibres after incorporation in the spinning melt, the new compounds are of neutral to slightly reddish shade. Being more highly soluble, their saturation limit in polyester spinning melts, and consequently the attainable degree of whiteness in the spun fibre, is up to two times greater.

With these advantages, together with their high light and washing fastness, the new compounds produced by the present process represent an advance in the technology of optical brightening for fibres, film, sheeting, panelling and other forms into which synthetic materials are converted. They are especially valuable for the optical brightening or synthetic, notably polyester, fibres in the spinning melt, for which they are added with advantage in the condensation reaction, and of synthetic materials to be processed as moulded products.

In the application of the new compounds it was surprising and could not have been foreseen that they are more highly effective in polyester spinning melts and have a redder shade than the non-anellated triazole derivatives described in Belgian Pat. No. 695,656, although the conjugation is longer in relation to these latter brighteners.

The coumarinyl-v-triazole oxides disclosed in Dutch patent application 6,802,175 are not optical brighteners.

The synthetic materials which are suitable for brightening with the new compounds include the polyesters formed with polyethylene glycol terephthalate and with the polyterephthalic acid ester of 1,4-bis-(hydroxymethyl)-cyclohexane, the polyamides from polycaprolactam and from polyhexamethylene diamine adipate or sebacate, the polymers of styrene, vinyl chloride or vinylidene chloride, polypropylene and polyethylene and cellulose esters. The brighteners can be incorporated in these materials in the course of their manufacture, for example in the spinning melts for polyester fibers and the moulding materials for polyester film, sheet and other moulded goods. They can be added prior to or during polymerization of the monomer. Given appropriate conditions, textiles and other manufactured goods made of the aforenamed synthetic materials can be optically brightened with the compounds of this invention, for which purpose they are applied either from aqueous dispersion or from solution in organic solvent.

The applied amounts of brightener may vary within wide limits, e.g. from 0.01% to 0.5% in relation to the weight of the substrate. The optimum amounts (0.015–0.1%) depend on the nature of the substrate and the brightening method and can be determined by simple preliminary trials.

In the following examples the parts and percentages are by weight and the temperatures in degrees centigrade.

EXAMPLE 1

A mixture of 10 parts of the hydrazonoxime of formula

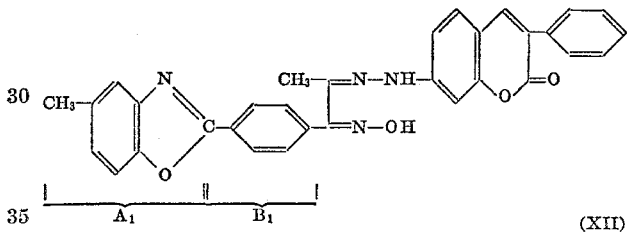

(melting point 252–255°), 30 parts of acetic anhydride, 30 parts of dimethyl formamide and 30 parts of pyridine is reacted for 2 hours at 80°, for 2 hours 30 minutes at 100° and for 30 minutes at the boiling temperature of the mixture. On cooling the 1,2,3-triazole compound settles out in the form of fine crystals with melting point 249–251°. The crystalline product is separated by filtration, washed thoroughly with ethanol and purified by recrystallization from chlorobenzene with the aid of decolorizing carbon. The melting point of the pale yellow powder obtained is 252–253° ($\lambda_{max}$=370 nm., e.=6.17×10⁴). In chlorobenzene solution the compound shows intense violet-blue fluorescence in natural light. Its properties make it highly suitable as a brightener additive to the spinning melts for polyester and polyamide fibres and for products formed of polystyrene, polyvinyl chloride and cellulose esters.

The starting hydrazonoxime of this example can be produced by the known methods, e.g. by condensation in the presence of 50% acetic acid of 3-phenyl-7-hydrazinocoumarin with the reaction product of hydroxyiminoacetone and the diazonium salt of 2-(p-aminophenyl)-5-methylbenzoxazole (melting point 170–180°), obtained by the method of W. F. Beech (J. Chem. Soc. 1955, 3094). Compounds of similarly good effectiveness are obtained when hydrazonoximes of Formula XII are used in which B₁ stands for the para-phenylene radical and A₁ for the benzoxazolyl-(2)-, 5,6-dimethylbenzoxazolyl-(2), 5-tert. butylbenzoxazolyl (2), 5,7-di(tert. butyl)-benoxazolyl-(2), 5-chlorobenzoxazolyl-(2), 6-phenylbenzoxazolyl-(2), 6-methoxybenzoxazolyl (2), 6-methylbenzothiazolyl-(2), 3-methylpyrazolyl-(1), 3-phenylpyrazolyl-(1), 5-phenyloxdiazolyl-(2), 5-(4'-chlorophenyl)-oxidazolyl-(2), 5-(4'-methylphenyl)-oxdiazolyl-(2), 5-phenylthiadiazolyl-(2), benzimidazolyl-(2), naphthotriazolyl-(2) or naphthoxazolyl-(2) radical; and further the hydrazonoximes of this formula in which B₁ stands for a single bond and A₁ for the 2-phenylbenzothiazolyl-(6), 2-phenylbenzoxazolyl-(6) or 2-phenylbenzoxazolyl-(5)

radical. With these hydrazonoximes the reaction procedure is the same as given in the foregoing.

EXAMPLE 2

20 parts of the hydrazonoxime of formula

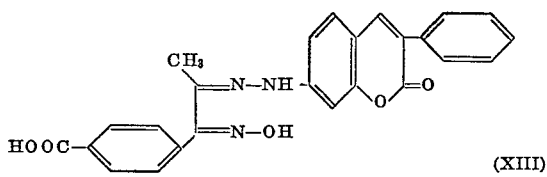

(XIII)

(melting point 292–294°) are suspended in 40 parts of dimethyl formamide, with the subsequent addition of 60 parts of acetic anhydride and 60 parts of pyridine. The mixture is reacted at three temperature levels as given in Example 1. On cooling the fine precipitate is filtered, washed with ethanol and dried. It melts at 313–314° and has the formula

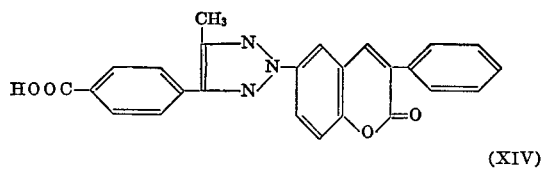

(XIV)

para-carboxyphenyltriazole compound

The further procedure is as in (a) or (b) below.

(a) A mixture of 13 parts of the para-carboxyphenyltriazole compound, 8.4 parts of 1-hydroxy-2-amino-4-iso-octylbenzene and 8 parts of boric acid is triturated. After the addition of 5 parts of ethylene glycol a jet of nitrogen gas is directed into the mixture which is raised in about 1 hour with stirring to 140°, then raised slowly in about 3 hours to 210°, during which time the water formed in the reaction is distilled. Subsequently stirring is continued for 3 hours at 210°. The suspension is then cooled under controlled conditions to room temperature, with the addition of 10 parts of ethylene glycol at 140° and 10 parts of 2-ethoxyethanol at 120°. The reaction product is isolated by filtration, washed with water, dried and purified by recrystallization for several times from chlorobenzene solution. The new compound is obtained as a pale greenish yellow powder with a melting point at 204–205°. It dissolves in 2-ethoxyethanol (1:6) at boiling temperature with powerful violet-blue fluorescence ($\lambda_{max.}=368$ nm., e.$=6.5\times 10^4$).

(b) A mixture of 10.6 parts of the para-carboxyphenyltriazole compound and 138 parts of chlorobenzene is stirred for some time, then 55 parts of the chlorobenzene are distilled (azeotropic drying) and the mixture allowed to cool in the absence of moisture. One part of dry dimethyl formamide is added and the mixture is reacted with 3.7 parts of thionyl chloride for 15–30 minutes at about 130°. On cooling the acid chloride formed is filtered off, washed with benzine and vacuum dried. 9.7 parts of the crude acid chloride are suspended in 110 parts of dry chlorobenzene and 4.9 parts of 1-amino-2-hydroxy-5-iso-octylbenzene, followed by 1.74 parts of pyridine, are added to the suspension at room temperature. The resulting mixture is raised to the refluxing temperature (130–135°) in a jet of nitrogen with thorough stirring and reacted for 6 hours at this temperature. On cooling the precipitated acid amide is filtered, washed with methanol and vacuum dried.

12.1 parts of the amide are entered into 10 times their amount of 1,2,4-trichlorobenzene, 5% of boric acid (relative to the amide) are added and the mixture is raised to the boiling temperature (210–215°) in a nitrogen current. During this time distillation of the water of reaction and some trichlorobenzene takes place.

After 4–5 hours at the stated boiling temperature the reaction is at an end. On cooling to 50° the benzoxazole compound formed is precipitated by the addition of 100 parts of methanol, filtered and purified by recrystallization as in procedure (a). The product is identical with that of procedure (a).

The 1-amino-2-hydroxy-5-iso-octylbenzene used in this example can be replaced by the equivalent amount of 1-amino-2-hydroxybenzene, 1-amino-2-hydroxy-5 - methylbenzene, -5-ethylbenzene, -5-tert. butylbenzene, -5-tert. amylbenzene, 1-amino - 2-hydroxy-4- or -5-chloro- or -bromo-benzene, 1-amino-2-hydroxy-4-phenylbenzene, 1, 2 - diaminobenzene, 1 - amino - 2 - mercaptobenzene or 1-amino-2-hydroxynaphthalene. The operating procedure with these compounds is as given in the foregoing, route (a) or (b) being followed as desired, and results in the same brighteners as are obtained by the procedure of Example 1.

EXAMPLE 3

A mixture of 10 parts of the hydrozonoxime of formula

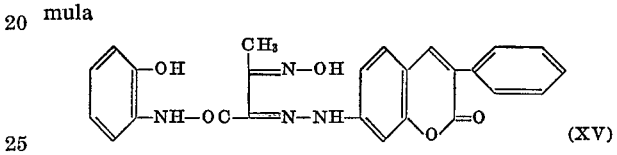

(XV)

20 parts of dimethyl acetamide, 20 parts of acetic anhydride and 20 parts of a technical mixture of pyridine bases is reacted for 2 hours at 80°, for 3 hours at 100° and for 1 hour at the boiling temperature of the mixture. As the mixture cools the triazole compound formed settles out in a fine form. It is worked up in the normal way. The crude product, together with a catalytic amount of boric acid (about 5% relative to the hydrozonoxime), is entered into 1,2,4-trichlorobenzene and the mixture is reacted at boiling temperature as described in Example 2, procedure (b) for cyclization to the azole compound ($\lambda_{max.}=365$ nm., e.$=4.1\times 10^4$). In place of dimethyl acetamide, the triazole ring closure can be carried out with equal success using dimethyl sulphoxide, tetramethylene sulphone or hexamethyl phosphoric acid triamide as solvent.

The hydrazonoxime employed in this example can be replaced by a hydrazonoxime which in the 2-hydroxyphenylamino radical in the left-hand position bears one or more lower alkyl and/or alkoxy groups or a phenyl group, on which compounds with very similar properties are formed. All these compounds exhibit intense violet-blue fluorescence in solution and by virtue of their good fastness properties they are well suitable for optically brightening synthetic materials.

The hydrazonoxime used as starting material can be produced, for example, by coupling a diazonium salt of 3-phenyl-7-aminocoumarin with a corresponding aceto-acetylaminobenzene, with subsequent oximation.

EXAMPLE 4

A mixture of 20 parts of the hydrazonoxime of formula

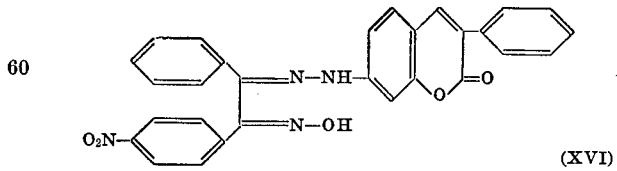

(XVI)

60 parts of propionic anhydride, 20 parts of pyridine and 40 parts of dimethyl formamide is cyclized to the triazole compound by reaction at increasing temperatures as given in Example 3. This is isolated and reduced in acid medium as follows. A suspension of 17.4 parts of tin (II) chloride in 107 parts of glacial acetic acid is prepared and hydrogen chloride is directed into it with stirring until a clear solution is formed. 10 parts of the finely pulverized nitro compound are added in portions so that the interior temperature does not exceed 50°. After stirring for 1 hour at 70–80° reduction is virtually complete. As the mixture cools the tin double salt of the amine settles out and is separated from the soluble tin salts by filtration. After the addition of 3.5 parts of 35% hydrochloric acid it is diazotized with 1.4 parts of sodium nitrite at 0–5° in the presence of 2-ethoxy-ethanol, with continued stirring for several hours at 5–10°. It is then coupled with 2.74 parts of 1-amino-3-methoxy-4-methylbenzene to form the ortho-aminoazo dye. In the presence of 1.2 parts of crystallized copper acetate the dye is oxidized in pyridine by the introduction of air at about 70° to give the compound of formula

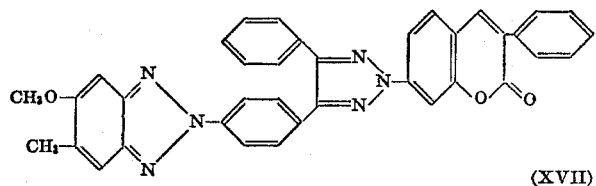

(XVII)

This compound is purified by recrystallization from chlorobenzene using decolorizing carbon and a trace of zinc dust. In place of the 1-amino-3-methoxy-4-methylbenzene used in the foregoing, 2.86 parts of 2-naphthylamine can be employed as coupling component, the procedure remaining otherwise the same, to give an equally effective product. If 4.46 parts of 2-napthylamine-1-sulphonic acid are used as coupling component, the coupling reaction is carried out optimally at 40–45° with cleavage of the sulphonic acid group. The resulting compounds, which are pale yellow powders, are very suitable brighteners for application in polyester and polyamide spinning melts. They are also obtained by the alternative route described in Example 1.

EXAMPLE 5

20 parts of the hydrazonoxime of formula

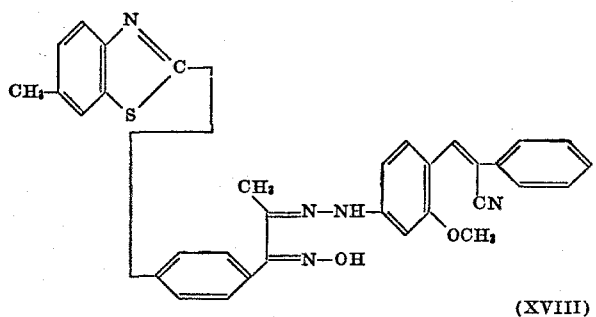

(XVIII)

are cyclized as in Example 1 and the 1,2,3-triazole formed is converted into the coumarin compond as follows. 11.14 parts of the product are suspended in 71 parts of dry chlorobenzene, to which 16 parts of pulverized anhydrous aluminum chloride are added, and the mixture is reacted for 5–6 hours with stirring and reflux condensing. After it has cooled it is mixed with 80 parts of ice and 11.8 parts of concentrated hydrochloric acid. The chlorobenzene is eliminated from the mixture with the aid of water vapour, after which the yellowish precipitate is filtered, washed with water, dried and purified by recrystallization from ortho-dichlorobenzene using decolorizing carbon and a trace of zinc dust. The purified coumarin derivative melts at 282–283° $\lambda_{max.}=372$ nm., e=$6.95\times10^4$). It can also be obtained by the reaction procedure described in Example 1.

Very similar compounds are obtained when the procedure of this example is practised with starting hydrazonoximes of Formula XVIII in which the para-phenylene radical

is replaced by

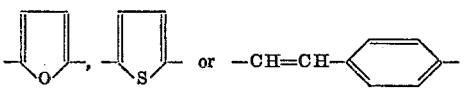

The hydroazonoximes employed as starting materials can be produced by the reaction in acetic acid medium of para-hydrazino-othromethoxy-(α-phenyl)-cinnamic acid nitriles with the corresponding hydroxyiminoketones, which are obtainable by the method of W. F. Beech.

EXAMPLE 6

Cyclization of 20 parts of the hydrazonoxime of formula

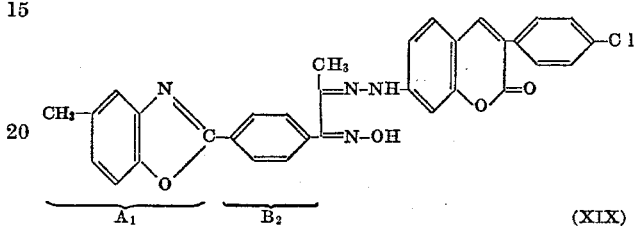

(XIX)

to the 1,2,3-triazole is carried out as specified in Example 1. It crystallizes from chlorobenzene as a pale yellow powder. The same procedure results in compounds of comparable efficacy when employed with hydrazonoximes of Formula XIX in which $B_2$ represents a single bond and the radical $A_2$ stands for

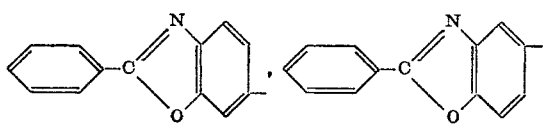

or

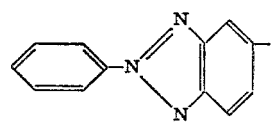

EXAMPLE 7

20 parts of the hydrazonoxime of formula

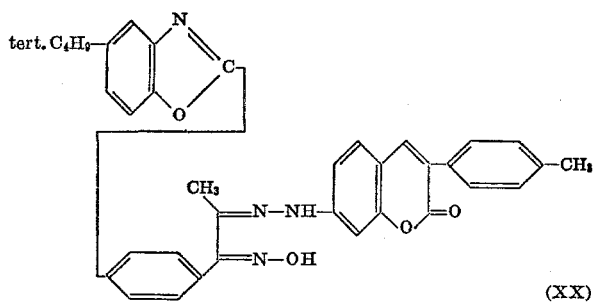

(XX)

are cyclized to the 1,2,3-triazole as given in Example 1. The purified product dissolves in chlorobenzene with intense violet-blue fluorescence and has properties rendering it an excellent brightener for the aforenamed organic materials.

Compounds with similar effectiveness as brighteners are obtained when the hydrazonoximes of Formula XX used in this example bear a 4-iso-propylphenyl, 4-tert. butylphenyl or 4-diphenylyl radical in place of the 4-methylphenyl radical occupying the right-hand position.

EXAMPLE 8

A solution of 64 parts of urea, 10 parts of glacial acetic acid and 100 parts of dimethyl formamide is prepared and raised to 135–140°, at which temperature 10 parts of the finely pulverized hydrazonoxime of formula

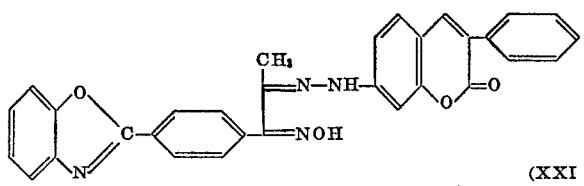

(XXI)

(melting point 291°) are added in small portions in 10 minutes with vigorous stirring. A clear orange solution forms from which the $NH_3$ and $CO_2$ escape. In about 30 minutes its temperature is increased to 160–165° and it is maintained at this temperature for about 2 hours, during which time approximately 40 parts of dimethyl formamide distill off. A further 6.4 parts of urea and 5 parts of glacial acetic acid are added to produce a clear brown melt, which is stirred for a further hour at 170–175°. At this point the product begins to settle out; the hydrazonoxime is no longer indicated. When the viscous melt has cooled it is diluted with 40 parts of methanol. The yellow-brown crystalline product is filtered and washed thoroughly with methanol, its melting point then being 252–254°. It is recrystallized from chlorobenzene using decolorizing carbon. The pale yellow powder obtained has its melting point at 275° ($\lambda_{max.}$=369 nm.). This product has very similar properties to the triazole derivative described in Example 1.

The aforedescribed cyclizing reaction can be carried out without glacial acetic acid, but the crude product then has a lower degree of purity and is obtained in inferior yield.

In place of the starting hydrazonoxime of Formula XXI used in this example the corresponding acetyl derivative can be employed, with which cyclization to the triazole takes place at 140–150°. The acetyl hydrazonoxime is readily accessible by the reaction of the hydrazonoxime with acetic anhydride in the presence of pyridine.

Hydrazonoximes of Formulae XII, XIII, XV, XVI, XVIII, XIX and XX can be cyclized to the triazole derivatives of Formula I in an analogous manner to the hydrazonoxime of Formula XXI of this example.

The table which follow specifies further brighteners of Formula I conforming to this invention. They are distinguished by the meanings of the symbols A and B, the melting point and the position of the absorption maximum (measured in dimethyl sulphoxide). The symbols $R_1$, $R_2$, $R_3$ and $m$ signify respectively hydrogen, hydrogen methyl and the number 1.

| Example number | A | B | Melting point in ° C. | Absorption maximum in nm. |
|---|---|---|---|---|
| 9 | [CH₃-C(CH₃)(CH₃)-benzoxazole] | [phenyl] | 216–7 | 371 |
| 10 | [phenyl-benzimidazole with N] | Same as above | 271–2 | 375–6 |
| 11 | [phenyl-benzimidazole NH] | do | 305–6 | 371 |
| 12 | [phenyl-oxadiazole] | do | 280–2 | 368 |
| 13 | [CH₃-benzoxazole] | | 260–2 | 365 |
| 14 | [phenyl-benzotriazole] | | 264–5 | 369 |
| 15 | [phenyl-benzoxazole] | | 244–5 | 363 |
| 16 | [phenyl-benzoxazole] | | 240–1 | 366 |

APPLICATION EXAMPLE A

In a stainless steel vessel fitted with a stirrer and a descending cooler, a mixture of 1000 parts of dimethyl terephthalate, 665 parts of ethylene glycol, 0.55 part of manganese acetate, 0.18 part of antimony trioxide and 0.6 part of one of the compounds of Examples 1, 5, 6 or 7 is reacted with heating. Splitting off of the methanol begins at about 160° and takes 2 hours 30 minutes. Towards the end of the reaction the temperature is increased to about 225°. 5 parts of titanium dioxide and 0.3 part of phosphoric acid are added to the melt, the pressure inside the vessel is reduced to below 1 mm. and the temperature is held at 290° until the desired degree of polymerization is reached. The polymer formed is spun as filament by the known method at 2–5 atmospheres excess pressure (inert gas). The polyester filament has a high degree of whiteness which is very fast to light and washing.

APPLICATION EXAMPLE B

In an autoclave with stirrer, a mixture of 1000 parts of ω-caprolactam, 30 parts of water, 4 parts of titanium dioxide and 0.4 part of one of the compounds of Examples 1, 3, 5 or 7 is heated for 4 hours at 240°. The resulting polyamide melt is extruded as strip through a slot extruder head, chilled and cut into chips. The dry chips show a markedly higher degree of whiteness than chips of a polymer without the addition of one of the compounds of Examples 1, 3, 5 or 7.

APPLICATION EXAMPLE C 1000 parts of polypropylene granules are sprayed with a solution of 0.15 part of the compound of Example 2 in 134 parts of methylene chloride, dried and mixed. The granules are processed on a roller mill at 140–220° and extruded as panels, which exhibit a substantially higher degree of whiteness than panels moulded from material without a brightener additive according to this invention. The compound of Example 2 can be used with equal success for brightening polypropylene fibres in the spinning melt.

APPLICATION EXAMPLE D 100 parts of a polyvinyl chloride moulding mixture consisting of 65 parts of polyvinyl chloride, 35 parts of a plasticizer such as dioctyl phthalate and 2%, relative to the polymer, of a stabilizer, are compounded with 0.05 part of an optical brightener obtained as in Examples 1, 5 or 7. After processing for 10 minutes at 150–160° on the roller mill the mixture is extruded as film. If an opaque film is desired, 2.5% titanium dioxide is added prior to processing. The film has a superior appearance to film not containing a brightener of this invention.

APPLICATION EXAMPLE E

An aqueous dispersion of 0.2% of the brightener of Example 1 is prepared with the aid of a dispersing agent. It is applied to a fabric of polyester fibre (polyethylene glycol terephthalate type) in a pressure dyeing machine for 90 minutes at 120–125° and liquor to fabric ratio 40:1. On removal the fabric is rinsed and dried. Compared with a sample of the same fabric treated in a blank bath, it exhibits a brilliant neutral white shade. Similarly, good brightening is obtained by applying by the pad-thermofix process an aqueous dispersion of the compound of Example 1 or a similar compound to fabric of the same type.

Formulae of representative 1,2,3-triazole compounds of the foregoing examples are as follows

EXAMPLE 1

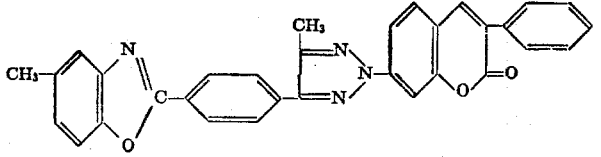

EXAMPLE 1—LAST PARAGRAPH

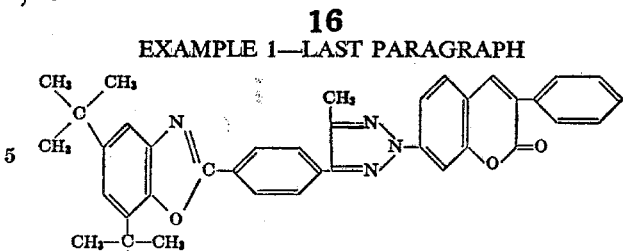

EXAMPLE 2

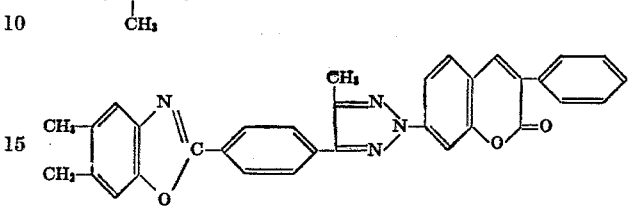

EXAMPLES 3 AND 8

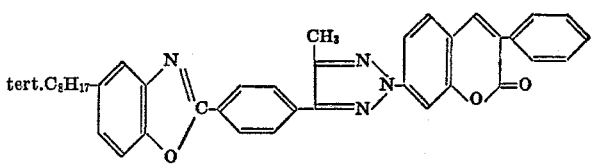

EXAMPLE 5

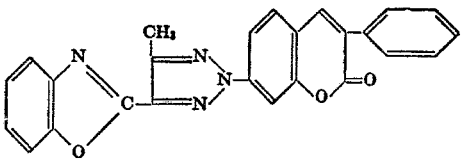

EXAMPLE 6

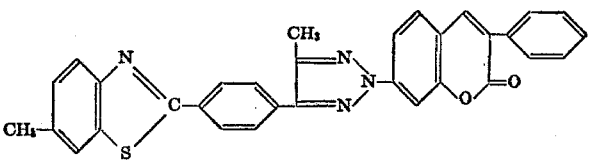

EXAMPLE 7

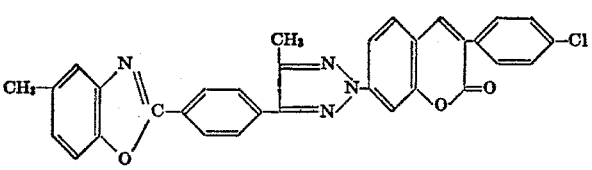

EXAMPLE 9

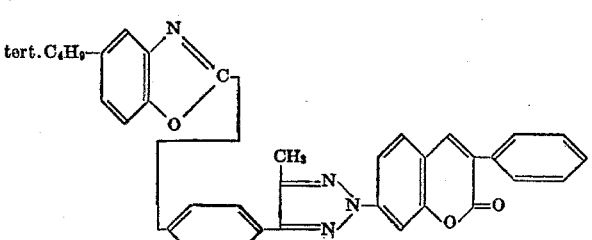

Having thus disclosed the invention what we claim is:
1. A compound of the formula

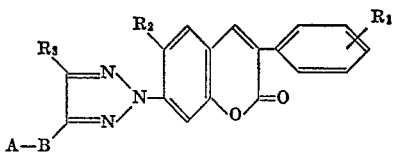

where
A is unsubstituted or substituted by alkyl of 1 to 12 carbon atoms, alkoxy of 1 to 4 carbon atoms, fluoro, chloro or bromo, and is benzoxazolyl or benzothiazolyl bound in the 2-, 5-, or 6-position or naphthoxazolyl bound in the 2-position,
B is a single bond,

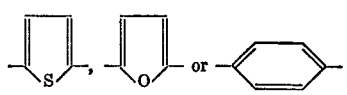

$R_1$ is hydrogen, halogen, alkyl or alkoxy of 1 to 8 carbon atoms, phenyl, methylphenyl or chlorophenyl,
$R_2$ is hydrogen or methyl, and
$R_3$ is hydrogen, alkyl of 1 to 8 carbon atoms or phenyl.

2. A compound according to claim 1 of the formula

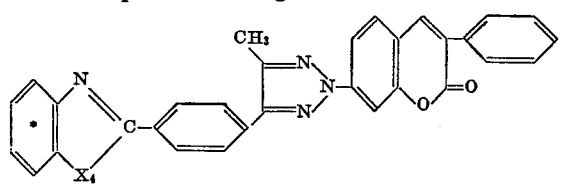

wherein $X_4$ is —O— or —S— and the benzene nucleus * may bear 1 or 2 methyl or tert.butyl radicals or 1 tert.octyl radical.

3. The compound according to claim 4 of the formula

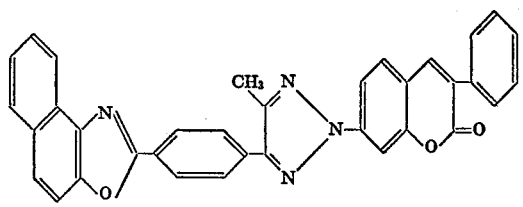

4. A compound of the formula

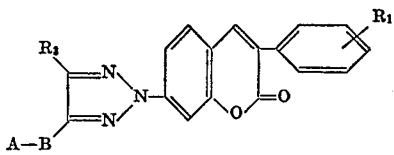

wherein
$R_1$ represents hydrogen, chlorine, alkyl with 1 to 4 carbon atoms or phenyl,
$R_3$ represents hydrogen, methyl or phenyl,
B represents a single bond or a bridge member selected from the group consisting of

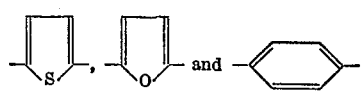

and A is a radical of the formula

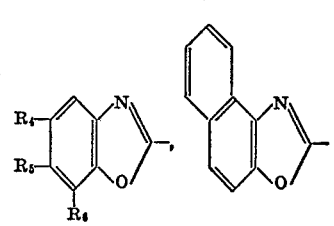

or

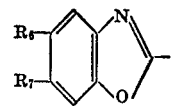

where
$R_4$ and $R_5$, independently stand for hydrogen, chlorine, alkyl with 1 to 8 carbon atoms, alkoxy with 1 to 8 carbon atoms, phenyl, benzyl or dimethylbenzyl, and
$R_6$ and $R_7$, independently for hydrogen or alkyl with 1 to 8 carbon atoms.

5. The 1,2,3-triazole compound according to claim 1 of the formula

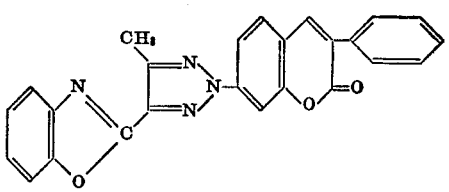

6. The 1,2,3-triazole compound according to claim 4 of the formula

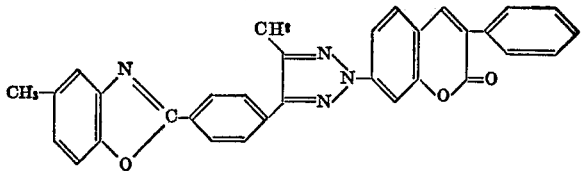

7. The 1,2,3-triazole compound according to claim 4 of the formula

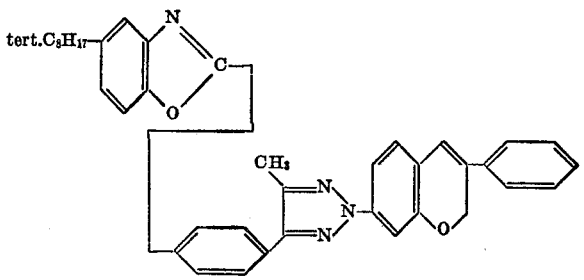

8. The 1,2,3-triazole compound according to claim 4 of the formula

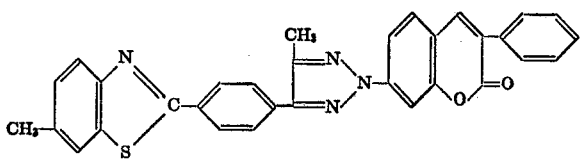

9. The 1,2,3-triazole compound according to claim 4 of the formula

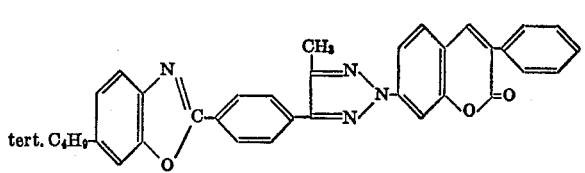

10. A compound according to claim 1 of the formula
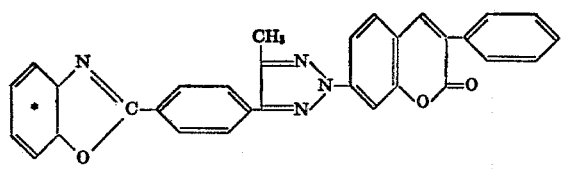
wherein the benzene nucleus * may bear 1 or 2 methyl or tert.butyl radicals or 1 tert.octyl radical.
References Cited
UNITED STATES PATENTS
3,501,490   3/1970   Maeder et al. _____ 260—307
NICHOLAS S. RIZZO, Primary Examiner
R. V. RUSH, Assistant Examiner
U.S. Cl. X.R.
252—301.2 W; 260—240 D, 306.8 D, 307 D, 307 G, 308 A